United States Patent
Aggarwal

(10) Patent No.: US 6,847,955 B2
(45) Date of Patent: Jan. 25, 2005

(54) SYSTEM AND METHOD FOR MINING UNSTRUCTURED DATA SETS

(75) Inventor: Charu C. Aggarwal, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 09/829,798

(22) Filed: Apr. 10, 2001

(65) Prior Publication Data

US 2003/0018594 A1 Jan. 23, 2003

(51) Int. Cl.⁷ .................................. G06N 5/02
(52) U.S. Cl. ............................. 706/45; 707/2
(58) Field of Search ................ 706/45; 707/2, 707/102

(56) References Cited

U.S. PATENT DOCUMENTS 5,857,179 A * 1/1999 Vaithyanathan et al. ....... 707/2
5,930,784 A * 7/1999 Hendrickson .................. 707/2
5,987,470 A * 11/1999 Meyers et al. .............. 707/102

* cited by examiner

*Primary Examiner*—Wilbert L. Starks, Jr.
(74) *Attorney, Agent, or Firm*—Scully, Scott, Murphy & Presser; Rafael A. Perez-Pineiro

(57) ABSTRACT

A method for mining incomplete data sets that avoids the process of having to extrapolate the attributes, and instead concentrate on the use of conceptual representations in order to mine the data sets. The idea in using conceptual representations is that even though many attributes may be missing, it is possible to accurately guess the behavior of the data along certain pre-specified directions, i.e., the conceptual directions of the data set.

16 Claims, 5 Drawing Sheets

Input: A set of N incomplete data records and dimensional indices i, j.

Output: Covariance between the dimensions i and j.

x(i, k) is the value of attribute i for record k if it is fully specified; otherwise the value is assumed to be zero N is the total number of records Input: Set of eigenvectors e(1)...e(d)

Output: Set of chosen eigenvectors q(1)...q(k)

SYSTEM AND METHOD FOR MINING UNSTRUCTURED DATA SETS

BACKGROUND OF THE INVENTION

1. Field of the Invention

This invention relates generally to data mining systems, and more specifically, to a system and method of mining incomplete data sets in which feature extraction operations are difficult and time consuming.

2. Discussion of the Prior Art

In recent years, massively incomplete data sets have become ubiquitous due to the fact that feature extraction operations are difficult for many unstructured data sets. In many cases, the attributes in the data sets become corrupted and difficult to handle. In other cases, the users are themselves unwilling to specify the attribute values. The result is a data set in which the values of many of the attributes are unknown. However, most known data mining algorithms are generally designed assuming that all of the attributes are specified.

There are currently several ways of mining data sets in which attributes are incompletely specified. For example, if the incompleteness occurs in a small number of rows, then one may wish to ignore these rows. As another example, if the incompleteness occurs in a small number of columns, then one may ignore those columns only. Furthermore, one may try to statistically predict the actual values of the attributes and then apply the data mining algorithms.

Each of these solutions is somewhat difficult in practice if most of attributes are incompletely specified. For example, every single record may have a few entries missing and every attribute may have some missing places for each record. In such cases, by ignoring some of the rows and/or columns, one may end up ignoring each and every entry in the data set. Furthermore, the use of statistical techniques becomes highly inaccurate when the number of missing entries in the data set are very high. In such cases, the correct values of the attributes cannot be guessed very accurately.

One of the characteristics of real data sets is that there are often considerable correlations among the different attributes. Consequently, there is considerable redundancy among the different attributes. These correlations create what is referred to as a "concept" structure in the data.

It would be highly desirable to provide a provide a technique that enables the mining of incompletely specified (unstructured) data sets even though the individual attributes are not completely reconstructed.

It would be highly desirable to provide a provide a technique that enables the mining of incompletely specified (unstructured) data sets that utilizes the correlation structure of the data in order to effectively guess the values of the concepts even though the attributes are not fully specified.

SUMMARY OF THE INVENTION

It is an object of the present invention to provide a technique that enables the mining of incompletely specified (unstructured) data sets by implementing conceptual structures in the data.

It is a further object of the present invention to provide a technique that enables the mining of unstructured data sets that utilizes the correlation structure of the data in order to effectively guess the values of the concepts even though the attributes are not fully specified or reconstructed.

It is an object of the present invention to provide a novel way of expressing the concept structure of data in terms of a new set of attributes and effectively use the resulting concept structure for data mining algorithms even when the data set is incompletely specified.

Thus, according to the principles of the invention, there is provided a method for mining an incomplete data set comprising data points having unspecified attribute values, the method comprising: a) constructing a coordinate system comprising a set of direction vectors for representing directions of correlation in the data points comprising the incomplete data set; b) transforming each data point in the incomplete data set to a conceptual coordinate value corresponding to each direction vector in the coordinate system, the coordinate values being used to create a new full dimensional representation of the data set; and, c) applying a data mining technique directly on the new full dimensional representation of the new data set comprising the conceptual coordinate values.

Advantageously, the method for mining an incomplete data set according to the invention avoids the process of having to extrapolate the attributes, and instead concentrates on the use of conceptual representations to facilitate mining of the data sets. The idea in using conceptual representations is that even though many attributes may be missing, it is possible to accurately guess the behavior of the data along certain pre-specified directions, i.e., the conceptual directions of the data set.

BRIEF DESCRIPTION OF THE DRAWINGS

Further features, aspects and advantages of the apparatus and methods of the present invention will become better understood with regard to the following description, appended claims, and the accompanying drawings where:

DETAILED DESCRIPTION OF THE PREFERRED EMBODIMENTS

Figure 1:
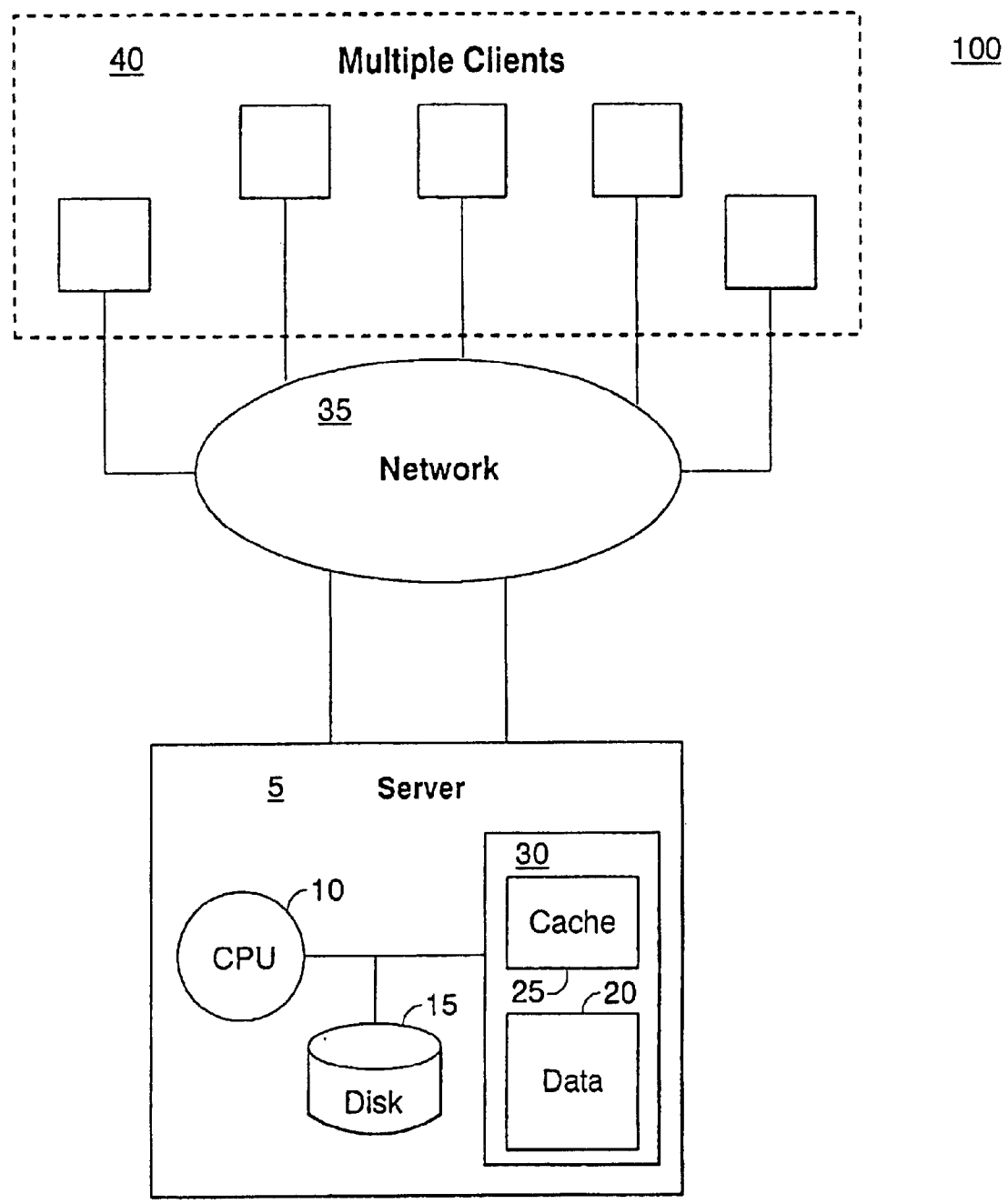
FIG. 1 is a general block diagram depicting the underlying system architecture for employing technique of present invention.

The technique implemented for incomplete data mining operations with the use of conceptual structures according to the invention is now generally described herein.

Considering by way of example, a supermarket application in which the customers may buy a wide variety of goods. In this case, it is well known that there are correlations among the different attributes. For example, a customer who buys bread is often likely to buy other diary products. Thus, if there exists a set of transactions which are incompletely specified, then by looking at those items which have been specified, one may still make an estimation of the consumption behavior of that customer.

Therefore, the first step in any data mining algorithm which uses such incomplete attributes is to mine the correlations from the data effectively and use conceptual representations. One way of mining the correlations from the data is to use the technique called Singular Value Decomposition which expresses the data in terms of the different principal components. These components are axes directions or vectors along which the data is approximately uncorrelated. This technique has been discussed in the prior art for dimensionality reduction of data sets and expression in a more compact format. A detailed description may be found in the reference to K. V. Ravikanth, D. Agrawal, A. entitled "Singh Dimensionality Reduction for Similarity Search in Dynamic Databases," Proceedings of the ACM SIGMOD Conference, 1998, the contents and disclosure of which are incorporated by reference as if fully set forth herein.

According to the technique, there is denoted the number "d" of dimensions in a data set. In order to perform the methodology of singular value decomposition, the following steps are performed:

(1) In the first step, a d*d covariance matrix is constructed for the data set. Specifically, the entry (i, j) in the matrix is equal to the covariance between the dimensions i and j; and,
(2) Determine the eigenvectors of this positive-semidefinite matrix, the eigenvectors defining an orthonormal system along which the second order correlations of the data are removed.

It should be noted that there are a total of "d" eigenvectors of the matrix, but not all of them are equally relevant in preserving the information in the data. More specifically, the eigenvectors corresponding to the largest few eigenvalues are the most valuable, since these are the directions of true correlations in the data and correspond to the concepts. In typical implementations of this technique, only a small percentage of the vectors corresponding to these directions are retained. All the data points are transformed to a coordinate system which is expressed in terms of these vectors.

It should be understood that the process of determining the covariance matrix is dependent upon the values of all the records being available. Since this may not always be the case, alternative methods are proposed for finding the covariance matrix for an incomplete data set. Once this covariance matrix is determined, methods are implemented for finding the accurate coordinates in this conceptual system. Once the new representation of the system has been determined, well known data mining techniques such as clustering or classification may be directly applied to this system. Thus, this technique reconstructs the coordinates in a conceptual way without trying to construct the original data set. This is because typical data mining techniques such as clustering and classification may be applied to the conceptual structure which is also a full dimensional representation of the data.

FIG. 1 is a general block diagram depicting the underlying system architecture 100 for employing technique of present invention. In its most general form, the architecture comprises a client-server system in which multiple users (clients) 40 may specify a data mining algorithm, and a data set on which the algorithm is to be run. The clients make these specifications across a network 35 to a server 5, on which the data mining algorithm is run. The server includes a Central Processing Unit (CPU) 10, and disk 15 and main memory 30 systems where the data set is processed. The CPU is the component in which most of the calculations are performed. The data 20 which is specified by the multiple users may be stored on a disk 15 which may be periodically read for the purpose of making computations. In addition, a main memory 30 is available in order to perform the calculations in the CPU. Optionally, a cache 25 may be retained in order to speed up all the calculations for this system. After processing the data set, the results are returned across the network to the multiple clients. It should be understood to skilled artisans that this is not the only architecture which may support such a system, though it is the most general one. Another possible architecture could include a desktop personal computer system with a keyboard, screen and user interface which may be more suitable in a single client environment.

Figure 2:
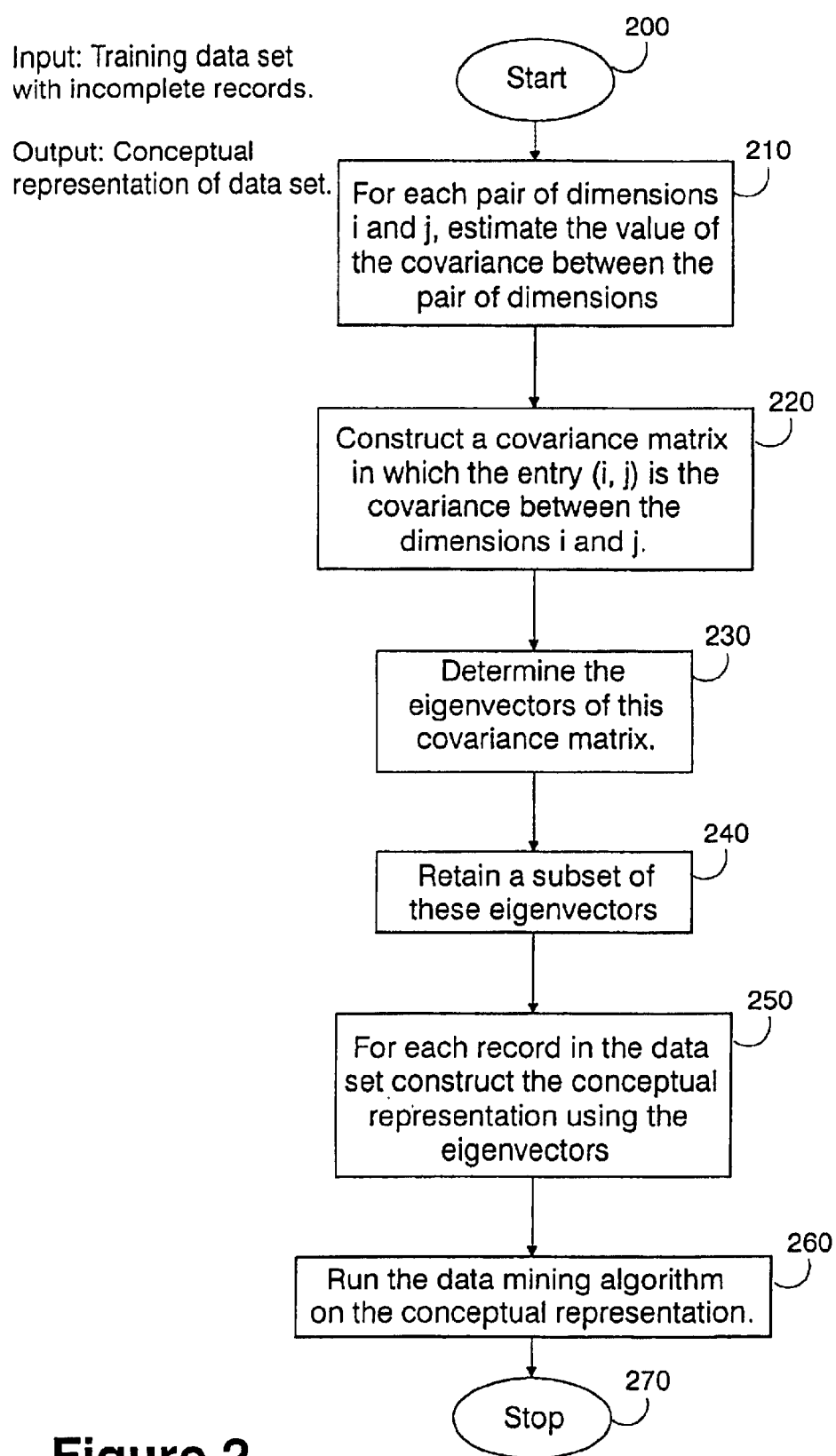
FIG. 2 is a general block diagram depicting the methodology 200 of the present invention.

FIG. 2 is a general block diagram depicting the methodology 200 of the present invention and particularly the overall process for determining the conceptual representation of the data. As indicated earlier, the covariance matrix is used in order to find the set of directions along which there is the greatest variance in the data characteristics. These are the "conceptual directions" of the data that are created by inter-attribute correlations. It is assumed that the dimensions are indexed from 1 though d. Thus, in step 210 in FIG. 2, the covariance between each pair of dimensions i and j are estimated. Here the values of i and j range from 1 through d. Even though calculation of the covariance matrix is well known in the prior art, there needs to be taken into account the fact that not all the attributes are known due to incomplete data sets. Therefore, a procedure for finding the covariance between every pair of dimensions, even when some of the attributes are missing is implemented as will be described herein in greater detail with respect to FIG. 3.

In step 220, FIG. 2, the computations of step 210 are used in order to construct the covariance matrix. Specifically, this is a d*d covariance matrix in which the entry (i,j) is equal to the covariance between the dimensions i and j. In step 230, by utilizing well know diagonalization techniques, the eigenvectors of this covariance matrix are determined. The process for determining the eigenvectors is well known in the prior art a detailed discussion of the process may be found in the reference to K. Hoffman, R. Kunze entitled "Linear Algebra," Prentice Hall, Second Edition, 1971 pages 181–219, the contents and disclosure of which is incorporated by reference as if fully set forth herein. It should be understood that the eigenvectors form a symmetric matrix. Next, at step 240, a subset "k" of these eigenvectors are chosen and retained as generally determined by the value of the corresponding eigenvalues determined as a result of the diagonalization operation. The process for deciding which eigenvectors to retain is described in greater detail herein with respect to FIG. 5.

According to the invention, these retained eigenvectors become the new axis system along which the data is represented. It is noted that the new axis system is an orthonormal axis-system, since the eigenvectors are orthonormal to one another. Next, at step 250, for each record in the data the conceptual representation of the record is constructed utilizing these eigenvectors. Specifically, a coordinate value is calculated along each of the k eigenvectors to result in a new record with k dimensions. A detailed description of the process for constructing the conceptual representation of the data in the record is provided herein with respect to FIG. 4. Once the procedure has been run on each record in the data set in order to result in a new k-dimensional data set, a data mining algorithm is executed on this new k-dimensional representation of the data as depicted at step 260, FIG. 2. Thus, the overall effect of the process is to use a new representation of the data set in order to run a full dimensional data mining algorithm, e.g., a clustering algorithm such as described in the reference to C. Aggarwal, C.

Procopiuc, J. Wolf, P. Yu, J. Park entitled Fast Algorithms for Projected Clustering. Proceedings of the ACM SIGMOD Conference, 1999, the whole contents and disclosure of which is incorporated by reference as if fully set forth herein. It should be understood that the new dimension 'k' is less than the dimensionality 'd' of the originally constructed, i.e., k<d.

Figure 3:
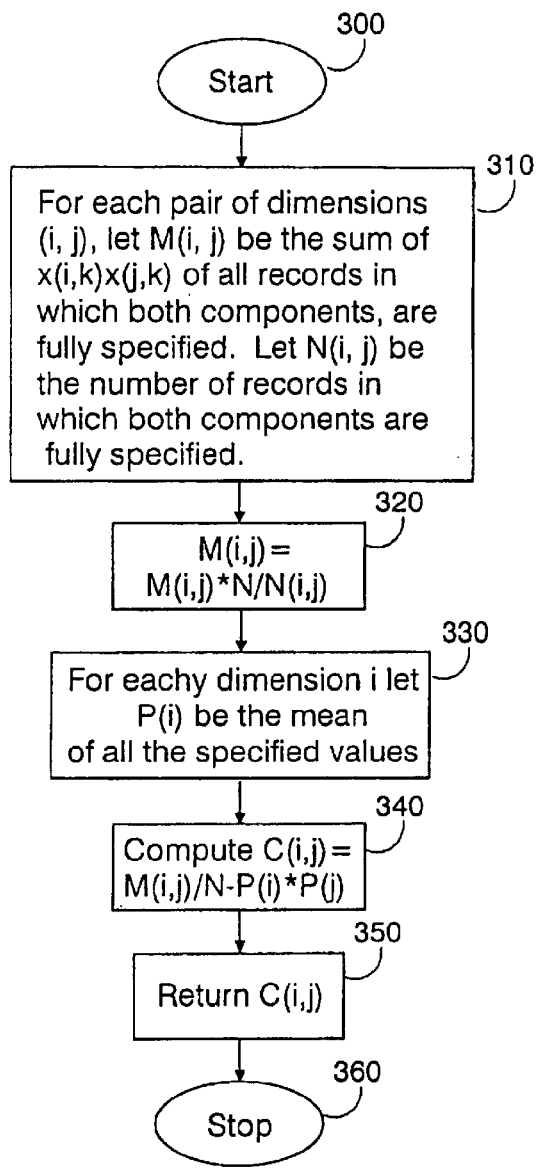
FIG. 3 is a detailed block diagram depicting how the covariance matrix is calculated according to the present invention as depicted in step 210 of FIG. 2.

FIG. 3 illustrates depicts in greater detail the method 300 for calculating an entry C(i,j) of the covariance matrix of the incomplete data set according to the present invention. Specifically, for each entry, the covariance "C" between the dimensions i and j is computed as follows: First, let x(i, k) be the value of the attribute "i" for record k if it is fully specified, i.e., x(i, k) is the i'th dimension of record k. In some cases this value is specified, whereas in others, this value may not be specified, in which case this value is assumed to be zero. In step 310, all those records for which both x(i, k) and x(j, k) are specified are found and the values of x(i, k)*x(j, k) are summed up for all of these records to result in a sum denoted as M(i, j) as follows:

$$M(i, j) = \sum_{\substack{\text{over all records } k \text{ in which both} \\ x(i,k) \text{ and } x(j,k) \text{ are specified}}} [x(i, k) * x(j, k)]$$

Additionally, a calculation is performed to count the number of records in which the values of both the attributes i and j are fully specified. This number is denoted as N(i, j). It is assumed that the total number of data points (i.e., records) is N. Consequently, N(i, j)<N. Then, at step 320, M(i, j) is updated according to the formula M(i,j)*N/N(i, j). The next step 330 involves calculating the mean of all the values in dimensions i and j, respectively, and these mean values are denoted by P(i) and P(j), respectively. It is noted that P(i) is computed using only those records which are specified. Therefore, letting S(i) be the number of records specified for dimension i, then the following summation is carried out for calculating P(i):

$$P(i) = \sum_{\substack{\text{over all records } k \text{ in} \\ \text{which } x(i,k) \text{ is specified}}} [x(i, k)/S(i)].$$

It should be understood that a similar calculation is implemented for calculating P(j). At step 340, the value C(i, j) is finally computed to be equal to M(i, j)/N−P(i)*P(j). This is equal to the covariance between the dimensions i and j and is returned as indicated at step 350. It should be understood that the method for calculating the covariance entry C(i,j) as depicted in FIG. 3, is repeated for each dimension in order to obtain covariance matrix of dimension d.

Figure 4:
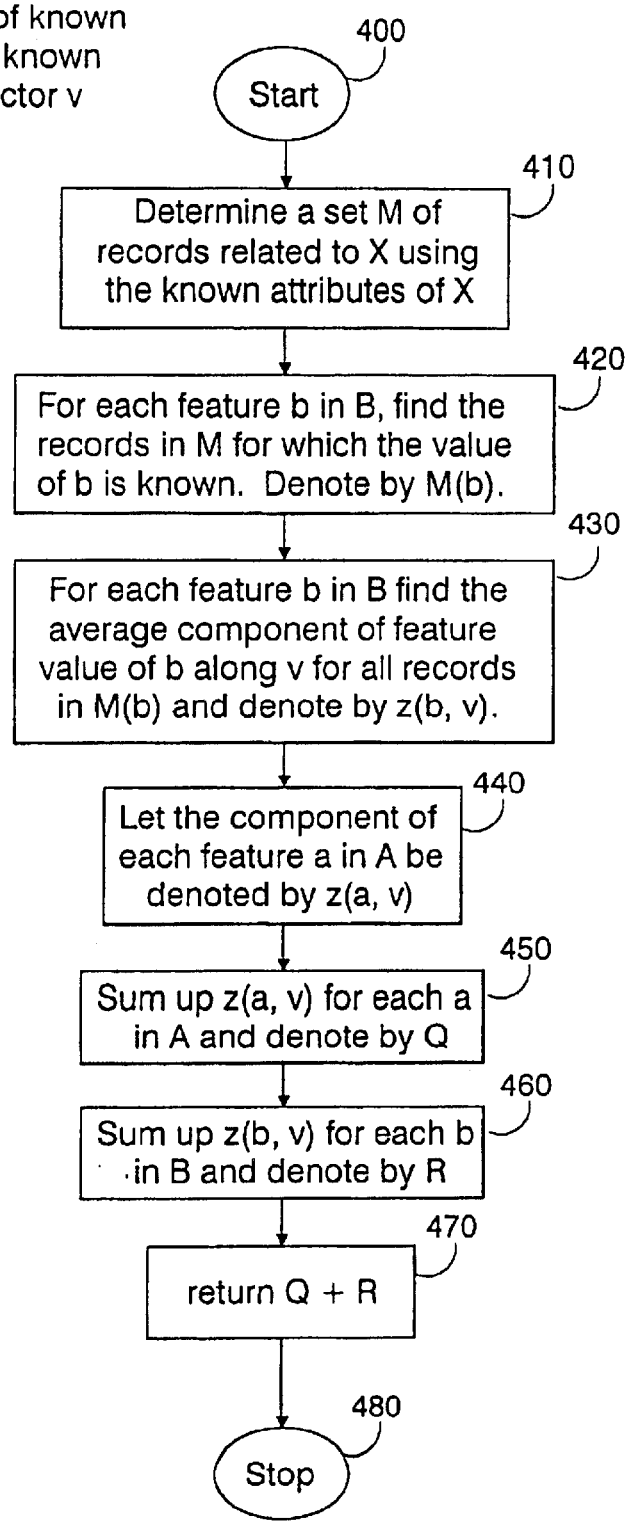
FIG. 4 is a detailed block diagram depicting how the closest records are computed to a given record based on the known set of attributes and used in order to estimate the conceptual coordinates.

FIG. 4 is a detailed block diagram depicting the process 400 for determining the conceptual coordinates along each of the retained 'k' eigenvectors, i.e., how the components along a single eigenvector are computed for a given data record X having known attributes ('A') and unknown attributes ('B'). This can also be considered a detailed description of step 250 of FIG. 2 which specifies a mapping or transformation of the coordinate values for each record in the directions of the retained eigenvectors (i.e., a conceptual representation of the data points). While the mapping process 400 for a record (data point) depicted in FIG. 4 is described with respect to one eigenvector, it is understood however, that the mapping process is iterative and repeated for all data points along each of the k directions (eigenvectors). In a first step, indicated as step 410, for a given record X (target record), there are found the records based on the known attributes A. This set of records is denoted by M and is closely related to the target record X along the eigenvector v. In order to determine whether a record is closely related to the target record along an eigenvector v, the dot product is taken of each of the known attributes along v, and added in proportion to their coordinates. This value is denoted as the conceptual component for a record. This calculation of the conceptual component is performed both for the target record X, as well as any of the other records. All records which have similar conceptual components to X are denoted by M. It should be understood that the number of such records which are found is user determinable and the more close records used, the more accurate the data mining results will be. The value of the component along a vector v is determined by summing the corresponding components based on both the features in A and B in the record. Therefore, each of these two cases is dealt with separately. Since the features in B are the unknown ones, the records in M are used in order to determine the correct components along these vectors. As illustrated at step 420, for each feature b, the subset of records M(b) is found in which the value of the feature b is known. Next, at step 430, the component of the feature value b is determined along eigenvector v for each record in M(b). The average value is determined over the different records in M(b) and is denoted by z(b, v). For the case of the attributes in A, the computations are much simpler because in this case, the value of z(a, v) is simply the component of each known feature value in A along the vector v. This is done by computing the inner (dot) product of the known value of the attribute a in X along v. In step 450, z(a, v) for each a in A is summed up and denoted by Q. That is $$Q = \sum_{\text{over all } a \text{ in } A} z(a, v).$$

In step 460, z(b, v) for each feature b in B is summed and denote by R as follows:

$$R = \sum_{\text{over all } b \text{ in } B} z(b, v).$$

Finally in step 470, the value Q+R is returned. Thus, along each direction (eigenvector) there is obtained the conceptual coordinate Q+R value.

Figure 5:
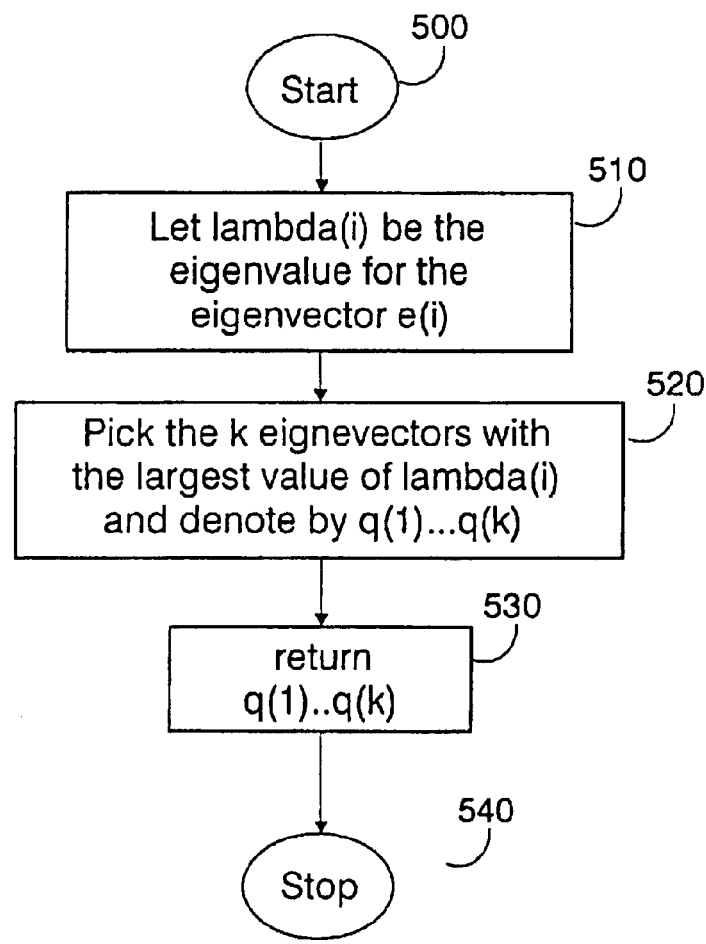
FIG. 5 is a detailed block diagram depicting how a particular subset of the eigenvectors are retained according to the present invention as depicted in step 240 of FIG. 2.

FIG. 5 is a detailed block diagram depicting the method 500 for determining which particular subset of the eigenvectors are to be retained according to the present invention as depicted in step 240 of FIG. 2. First, it is assumed that as input to the system there is a set of d eigenvectors denoted by e(1) . . . e(d) from which it is desired to pick a subset of these eigenvectors of cardinality k. The eigenvalue for the corresponding eigenvector i is denoted as lambda(i) as indicated at step 510. It is understood that the eigenvalues lambda(i) for eigenvector i are determined at step 230 as a result of the diagonalization operation performed according to techniques well known in the art. At step 520, 'k' eigenvectors are picked that correspond to the largest value of lambda(i) and denoted as q(1) . . . q(k). In step 530, the set of vectors q(1) . . . q(k) are returned and these are the vectors that form the new axis system (axis transformation).

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims. For example, according to the teachings provided herein, similar techniques may be employed for determining the conceptual data set without having to rigorously construct the co-variance matrix and determine the eigenvectors in order to specify the correlation directions in the data.

Having thus described our invention, what we claim as new, and desire to secure by Letters Patent is:

1. A method of using a computer for mining data records in a database, said data records forming an incomplete data set comprising data points having unspecified attribute values, said method comprising:
  a) constructing a coordinate system comprising a set of direction vectors for representing directions of correlation in the data points comprising said incomplete data set;
  b) transforming each said data point in said incomplete data set to a conceptual coordinate value corresponding to each direction vector in said coordinate system, said coordinate values being used to create a new full dimensional representation of the data set; and,
  c) applying a data mining technique directly on the new full dimensional representation of the new data set comprising said conceptual coordinate values, wherein said new full dimensional representation of said incomplete data set facilitates application of said data mining technique.

2. The method of using a computer for mining data records in a database as claimed in claim 1, wherein the directions of correlation are determined using correlation values among different dimensions of the data set.

3. The method of using a computer for mining data records in a database as claimed in claim 2, wherein the correlation value between said two dimensions is the covariance between the dimensions, said method further including, prior to step a), the steps of:
  estimating the values of the covariance between each pair of dimensions in said data set; and
  constructing a covariance matrix having entries comprising the covariance between said dimension pair.

4. The method of using a computer for mining data records in a database as claimed in claim 3, wherein the set of direction vectors for representing directions of correlation in the data are eigenvectors of said covariance matrix, said method including the step of:
  performing a diagonalization operation on said constructed covariance matrix for determining a set of eigenvectors;
  selecting a sub-set of eigenvectors to define said set of direction vectors.

5. The method of using a computer for mining data records in a database as claimed in claim 4, wherein each eigenvector of said sub-set is selected according to a value of a corresponding eigenvalue.

6. The method of using a computer for mining data records in a database as claimed in claim 3, wherein a conceptual coordinate value is determined for each of the directions of correlation in the data set.

7. The method of using a computer for mining data records in a database as claimed in claim 2, wherein the step b) of transforming each said data point in said incomplete data set to a conceptual coordinate value includes the step of finding a number of data points which are related to that data point based on the known attributes.

8. The method of using a computer for mining data records in a database as claimed in claim 7, wherein the number of such data points is user selectable.

9. A program storage device readable by machine, tangibly embodying a program instructions executable by the machine to perform method steps of using a computer for mining data records in a database, said data records forming an incomplete data set comprising data points having unspecified attribute values, said method steps comprising:
  a) constructing a coordinate system comprising a set of direction vectors for representing directions of correlation in the data points comprising said incomplete data set;
  (b) transforming each said data point in said incomplete data set to a conceptual coordinate value corresponding to each direction vector in said coordinate system, said coordinate values being used to create a new full dimensional representation of the data set; and,
  (c) applying a data mining technique directly on the new full dimensional representation of the new data set comprising said conceptual coordinate values, wherein said new full dimensional representation of said incomplete data set facilitates application of said data mining technique.

10. The program storage device readable by a machine as claimed in claim 9, wherein the directions of correlation are determined using correlation values among different dimensions of the data set.

11. The program storage device readable by a machine as claimed in claim 10, wherein the correlation value between said two dimensions is the covariance between the dimensions, said method further including, prior to step a), the steps of:
  estimating the values of the covariance between each pair of dimensions in said data set; and
  constructing a covariance matrix having entries comprising the covariance between said dimension pair.

12. The program storage device readable by a machine as claimed in claim 11, wherein the set of direction vectors for representing directions of correlation in the data are eigenvectors of said covariance matrix, said method including the step of:
  performing a diagonalization operation on said constructed covariance matrix for determining a set of eigenvectors;
  selecting a sub-set of eigenvectors to define said set of direction vectors.

13. The program storage device readable by a machine as claimed in claim 12, wherein each eigenvector of said sub-set is selected according to a value of a corresponding eigenvalue.

14. The program storage device readable by a machine as claimed in claim 11, wherein a conceptual coordinate value is determined for each of the directions of correlation in the data set.

15. The program storage device readable by a machine as claimed in claim 10, wherein the step b) of transforming each said data point in said incomplete data set to a conceptual coordinate value, includes the step of finding a number of data points which are related to that data point based on the known attributes.

16. The program storage device readable by a machine as claimed in claim 15, wherein the number of such data points is user selectable.

* * * * *